(12) United States Patent
Bloch et al.

(10) Patent No.: US 12,745,007 B2
(45) Date of Patent: Sep. 22, 2026

(54) VIRTUAL ZOOM LENS

(71) Applicant: QUALITY VISION INTERNATIONAL INC., Rochester, NY (US)

(72) Inventors: Stephanie M. Bloch, Penfield, NY (US); Timothy Gerard Moriarty, Cleveland, GA (US); Daniel C. Abbas, Webster, NY (US)

(73) Assignee: Quality Vision International Inc., Rochester, NY (US)

(*) Notice: Subject to any disclaimer, the term of this patent is extended or adjusted under 35 U.S.C. 154(b) by 78 days.

(21) Appl. No.: 18/762,398

(22) Filed: Jul. 2, 2024

(65) Prior Publication Data

US 2024/0357236 A1 Oct. 24, 2024

Related U.S. Application Data

(62) Division of application No. 17/670,225, filed on Feb. 11, 2022, now Pat. No. 12,052,501.

(Continued)

(51) Int. Cl.

*H04N 23/69* (2023.01)
*G01B 11/00* (2006.01)
*H04N 25/76* (2023.01)

(52) U.S. Cl.

CPC .......... *H04N 23/69* (2023.01); *G01B 11/002* (2013.01); *H04N 25/76* (2023.01)

(58) Field of Classification Search

CPC ........ H04N 23/69; H04N 25/76; H04N 23/75; G01B 11/002; G01B 11/005; G01B 11/24; G01B 11/022

(Continued)

(56) References Cited

U.S. PATENT DOCUMENTS 6,376,819 B1 * 4/2002 Neal .......................... G01J 9/00 356/121
7,995,138 B2 8/2011 Yamazaki et al.

(Continued)

FOREIGN PATENT DOCUMENTS

DE 10 2014 119436 B4 11/2016
EP 2813809 A1 12/2014

(Continued)

OTHER PUBLICATIONS

THORLABS (May 2019) "Bi-Telecentric Lenses for Machine Vision" 9 pages.

*Primary Examiner* — Md M Rahman
(74) *Attorney, Agent, or Firm* — Harter Secrest & Emery LLP

(57) ABSTRACT

A method of edge detection with an optical measuring machine including aligning a test object with a lens system having a variable size aperture, wherein the lens system is operable to form an image of the test object on a digital sensor having an array of addressable pixels, and wherein the variable size aperture is operable to image points of the test object on the digital sensor at different spot sizes. Setting the variable size aperture to a first size and binning contiguous clusters of the addressable pixels into image pixels having a first size in accordance with the number of addressable pixels within each of the image pixels. Identifying contrast variations of the test object imaged onto the digital detector over a number of image pixels at the variable aperture first size, whereby an area of the test object is imaged at a first effective magnification.

6 Claims, 17 Drawing Sheets

Related U.S. Application Data

(60) Provisional application No. 63/222,626, filed on Jul. 16, 2021, provisional application No. 63/148,200, filed on Feb. 11, 2021.

(58) Field of Classification Search
USPC .......................................................... 356/625
See application file for complete search history.

(56) References Cited

U.S. PATENT DOCUMENTS

| | | | | |
|---|---|---|---|---|
| 8,674,301 | B2 | 3/2014 | Takagi | |
| 8,689,127 | B1 | 4/2014 | Ding et al. | |
| 10,126,540 | B2 | 11/2018 | Lawson et al. | |
| 10,701,259 | B2 | 6/2020 | Bloch | |
| 2004/0246479 | A1* | 12/2004 | Cartlidge | G06T 3/40 250/222.2 |
| 2014/0362385 | A1 | 12/2014 | Uemura | |
| 2017/0329012 | A1 | 11/2017 | Buttgen et al. | |
| 2018/0359404 | A1 | 12/2018 | Yonetani | |
| 2020/0340799 | A1 | 10/2020 | Fuyuno et al. | |
| 2021/0152810 | A1 | 5/2021 | Jensen et al. | |

FOREIGN PATENT DOCUMENTS

| | | | |
|---|---|---|---|
| JP | 2014-238299 | A | 12/2014 |
| JP | 2018-6995 | A | 1/2018 |
| WO | 2020/207571 | A1 | 10/2020 |

* cited by examiner

| Binning | Image Pixel Size (µm) | Spot size (µm) | $F_i$ | $F_o$ | DOF (mm) | Image Width (pixels) | Image Height (pixels) | FOV (mm) |
|---|---|---|---|---|---|---|---|---|
| 1 | 2 | 10 | 6.8 | 7.6 | 0.17 | 640 | 480 | 1.2 |
| 2 | 4 | 20 | 13.7 | 15.2 | 0.67 | 1280 | 960 | 2.3 |
| 3 | 6 | 30 | 20.5 | 22.8 | 1.52 | 1920 | 1440 | 3.5 |
| 4 | 8 | 40 | 27.3 | 30.4 | 2.70 | 2560 | 1920 | 4.6 |

VIRTUAL ZOOM LENS

CROSS-REFERENCE TO RELATED APPLICATIONS

This patent application is a divisional, and claims the priority benefit of U.S. patent application Ser. No. 17/670,225, filed Feb. 11, 2022 entitled "VIRTUAL ZOOM LENS", which claims the priority benefit of U.S. Provisional Patent Application No. 63/148,200, filed Feb. 11, 2021, entitled "VIRTUAL ZOOM LENS" and U.S. Provisional Patent Application No. 63/222,626, filed Jul. 16, 2021, entitled "VIRTUAL ZOOM LENS", each of which is incorporated herein by reference in its entirety for all purposes.

TECHNICAL FIELD

The present disclosure generally relates to optically based dimensional measurement systems, and more particularly to optically based dimensional measurement systems that operate at different effective magnifications for such purposes as adjusting field of view, depth of field, and optical resolution.

BACKGROUND

Conventional optical dimensional measurement systems contain zoom lenses for capturing images of test objects at different magnifications. Lower magnifications provide for capturing images of the test object over a wider field of view and a greater depth of field for such purposes as identifying features of interest or taking lower accuracy measurements. Higher magnifications provide for capturing images of the test object over a narrower field of view and a shallower depth of field for such purpose as identifying finer features or taking more accurate measurements. A range of different magnifications can be provided for identifying and resolving features in accordance with different measurement objectives.

Conventional zoom lenses require additional components for moving optical elements, which are susceptible to failure, and can be subject to undesirable optical performance variations between the different magnification positions. For example, conventional zoom lenses can exhibit varying amounts of distortion over their zoom range. The cost of zoom lenses also tends to increase with requirements of coaxial and parfocal designs to avoid additional adjustments between different magnification settings.

The zoom lenses, as parts of optical imaging systems, form images of the test objects on digital sensors having respective arrays of pixels. The optical dimensional measurement systems analyze these images and accurately determine (measure) where edges or other transitional features of the test objects are located. Typically, edge detection algorithms process contrast variations spread over a number of pixels in transition to achieve accurate, repeatable results. Variations in image resolution between different magnification settings, including such variations over the field of view can detract from the performance of the edge detecting algorithms or require different adaptations for the different magnification settings.

SUMMARY

Instead of using a conventional zoom lens to vary field of view and depth of field, an optical imaging system for a dimensional measurement system can be constructed as described herein with a fixed lens system having a variable size aperture together with additional controls for extracting and processing pixelated image data from a digital sensor. The presently disclosed optical imaging system can be constructed to significantly reduce axial motions among lens components and remain both coaxial and parfocal at different digital magnifications. In addition, the presently disclosed optical imaging system can effectively maintain image resolution in an optimal form for edge detection processing at the different digital magnifications.

For example, an optical imaging system for a dimensional measuring machine can be arranged with a digital sensor having an array of addressable pixels, a lens system that provides for forming an image of a test object on the digital sensor, and a variable size aperture of the lens system that changes an f-number of the optical system for imaging points of the test object on the digital sensor at different spot sizes. An aperture controller varies the aperture size. An image controller groups contiguous clusters of one or more of the pixels to a common output such that the number of pixels within each of the clusters having a common output can be varied. A magnification controller that works in conjunction with the aperture controller and the image controller provides for (a) increasing the number of pixels within each of the clusters having a common output in accordance with an increase in the spot sizes at which points of the test object are imaged and (b) decreasing the number of pixels within each of the clusters having a common output in accordance with a decrease in the spot sizes at which points of the test object are imaged.

Each of the clusters of one or more pixels occupies a sub-area of the digital sensor in accordance with the number of pixels within each of the sub-areas, and the magnification controller can vary the subareas in size in accordance with variations in the spot sizes at which points of the test object are imaged. The magnification controller can vary the size of the subareas to more closely maintain the size of the subareas as a given fractional portion of the spot sizes at which points of the test object are imaged. The magnification controller can also provide for filling spot sizes associated with different aperture sizes with the same number of subareas.

Similarly, the magnification controller can also be arranged to (a) increase the size of the sub-areas in accordance with an increase in the f-number of the optical system and (b) decrease the size of the sub-areas in accordance with a decrease in the f-number of the optical system. Preferably, the magnification controller increases a linear dimension of the subareas substantially proportional to the increase in the f-number of the optical system.

The imaging system can further comprise a display for displaying the test object at different magnifications, and the magnification controller can provide for (a) increasing the magnification of the test object on the display in accordance with a decrease in the size of the subareas and (b) reducing the magnification of the test object on the display in accordance with an increase in the size of the subareas. The magnification of the test object on the display can be sized inversely proportional to the size of the subareas. The increase in the size of the subareas can be associated with an increase in an area of the sensor from which the test object is displayed and the decrease in the size of the subareas can be associated with a decrease in the area of the sensor from which the test object is displayed. The same total number of subareas can be displayed resulting in different display magnifications.

As a further example, an optical measuring system for making dimensional measurements of a test object can include a digital sensor having an array of addressable pixels, a lens system that provides for forming an image of the test object on the digital sensor, and a variable size aperture of the optical system that changes an f-number of the optical system. An aperture controller varies the aperture size. An image controller groups contiguous clusters of one or more of the pixels having a common output into respective subareas of the digital sensor that can be varied in size in accordance with the number of pixels within each of the subareas. A magnification controller that works in conjunction with the aperture controller and the image controller provides for (a) increasing the subareas in size in accordance with a decrease in the aperture size and (b) decreasing the subareas in size in accordance with an increase in the aperture size. A measurement controller including an edge detector detects edges of the test object imaged onto the digital detector based on output variations among the subareas such that the edges of the test object are detectable through a greater depth of field as the subareas are increased in size and the edges of the test object are more finely resolvable as the subareas are decreased in size.

The variable size aperture of the optical system can change the f-number of the optical system for imaging points of the test object on the digital sensor at different spot sizes, and the magnification controller can provide for (a) increasing the number of pixels within each of the subareas in accordance with an increase in the spot sizes at which points of the test object are imaged and (b) decreasing the number of pixels within each of the subareas in accordance with a decrease in the spot sizes at which points of the test object are imaged. The magnification controller can vary the size of the subareas to more closely maintain the size of the subareas as a given fractional portion of the spot sizes at which points of the test object are imaged. The magnification controller can provide for filling the spot sizes associated with different aperture sizes with the same number of subareas. For instance, a linear dimension of the spot sizes associated with different aperture sizes can be filled by five subareas. The magnification controller can also direct outputs from the same total number of subareas to the edge detector at the different aperture sizes.

The magnification controller can also provide for (a) increasing the size of the subareas in accordance with an increase in the f-number of the optical system and (b) decreasing the size of the subareas in accordance with a decrease in the f-number of the optical system. The magnification controller can increase a linear dimension of the subareas substantially proportional to the increase in the f-number of the optical system.

The measuring system can include a display for displaying the test object at different magnifications, and the magnification controller can provide for (a) increasing the magnification of the test object on the display in accordance with a decrease in the size of the subareas and (b) reducing the magnification of the test object on the display in accordance with an increase in the size of the subareas. The magnification of the test object on the display can be sized inversely proportional to the size of the subareas. Both the edge detector and the display can receive outputs from the same subareas of the digital sensor.

The optical system can include a front lens and a back lens in fixed positions with respect to the variable size aperture. In one configuration, the front lens and back lenses are arranged in a telecentric arrangement with the variable size aperture. However, it should be appreciated that many of the benefits of the invention can be realized with arrangements that are not telecentric. Thus, in certain configurations, front lens and back lenses are not telecentric. In an embodiment, the measurement controller is arranged for detecting two edges on the test object and for measuring a distance between the two edges based on the number and size of the subareas between the two edges. The measurement controller may also be arranged for detecting edges of a test object and constructing polyhedral features, the dimensions of which can then be determined.

An exemplary method of measuring dimensions of a test object with an optical measuring machine can begin with relatively aligning the test object with an optical system that has a variable size aperture and provides for forming an image of the test object on a digital sensor having an array of addressable pixels. The variable size aperture is set to a first size. Contiguous clusters of the pixels having a common output are grouped into respective subareas of the digital sensor having a first size in accordance with the number of pixels within each of the subareas. Two or more edges of the test object imaged onto the digital detector may be identified based on output variations among the first size subareas, wherein the two or more edges of the test object are in focus through a first depth of field and at a first resolution. In addition, the optical measuring machine may be utilized at the first depth of field and the first resolution when a larger field of view of the test object is desired. For example, the larger field of view may be desired to determine where on the test object a measurement is taken.

The variable size aperture is also operable to be set to a second larger size. Contiguous clusters of one or more of the pixels having a common output are then regrouped into respective subareas of the digital sensor having a second smaller size in accordance with a reduced number of pixels within each of the subareas. A dimensional measurement may be made using two different fields of view at the higher resolution by moving the stage on which the test object is located. For example, two or more edges of the test object imaged onto the digital detector are identified based on output variations among the second smaller size subareas, wherein the two or more identified edges of the test object are in focus through a second shallower depth of field and at a second finer resolution. A distance between two of the two or more edges may be measured based on the number and size of the second smaller size subareas between the two edges.

In an embodiment, edge detection software is operable to use a low magnification (larger field of view) to identify a feature of the test object to be measured, and the dimensional measurement is then made at a higher magnification (smaller field of view). The step of setting the variable size aperture to the second larger size decreases an f-number of the optical system for imaging points of the test object on the digital sensor at smaller spot sizes, and the step of regrouping reduces the subareas of pixels in size in accordance with the smaller spot sizes at which points of the test object are imaged. The step of regrouping reduces the size of the subareas of pixels to more closely maintain the size of the subareas as a given fractional portion of the spot sizes at which points of the test object are imaged.

BRIEF DESCRIPTION OF THE DRAWING FIGURES

The accompanying drawings are incorporated herein as part of the specification. The drawings described herein illustrate embodiments of the presently disclosed subject matter and are illustrative of selected principles and teachings of the present disclosure. However, the drawings do not illustrate all possible implementations of the presently disclosed subject matter and are not intended to limit the scope of the present disclosure in any way FIG. 1 is a schematic perspective view of a dimensional measuring machine according to an exemplary embodiment the presently disclosed subject matter.

FIG. 3 is a table of design parameters for four effective magnifications of an optical imaging system according to an exemplary embodiment the presently disclosed subject matter.

DETAILED DESCRIPTION

Figure 1:
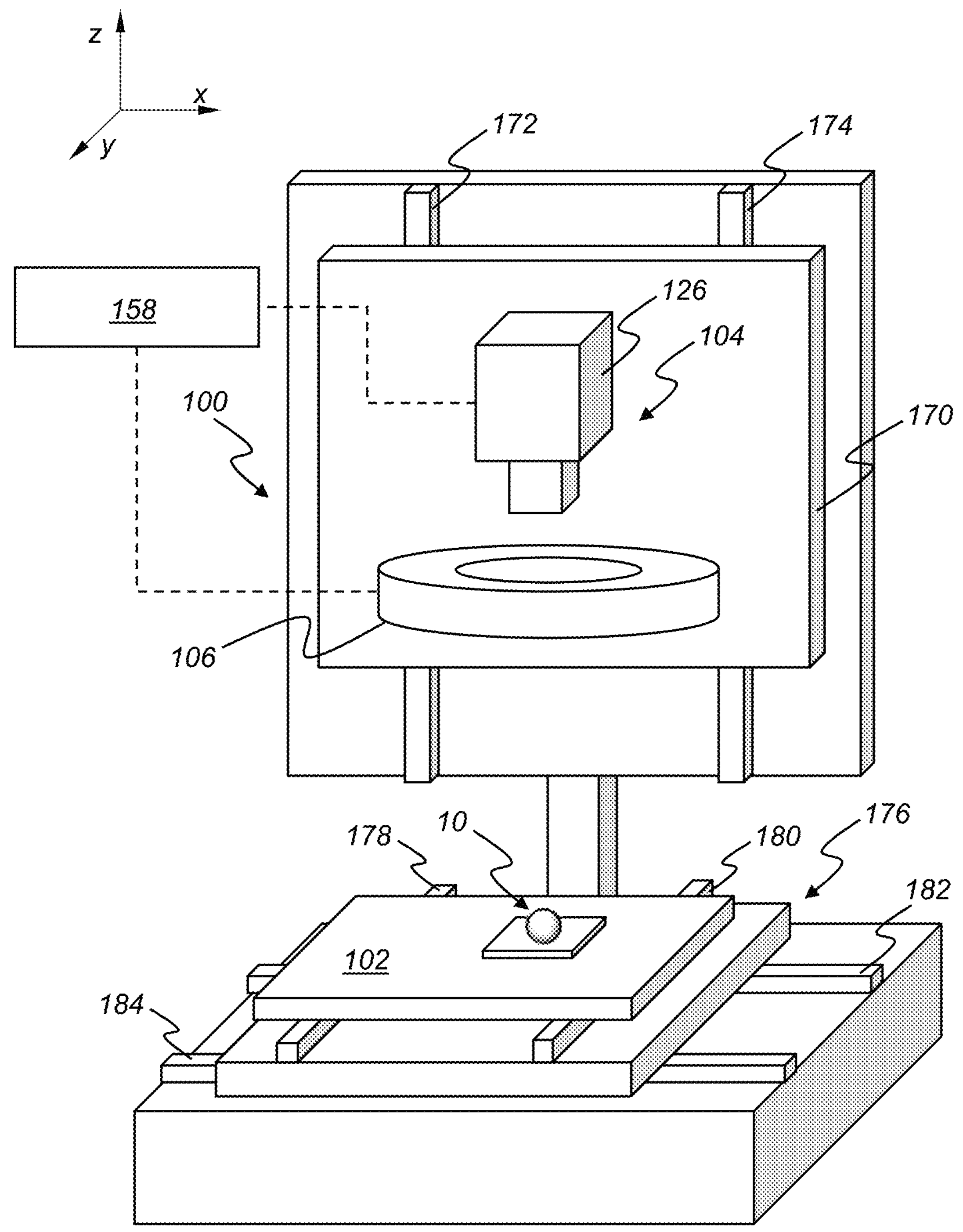

It is to be understood that the invention may assume various alternative orientations and step sequences, except where expressly specified to the contrary. It is also to be understood that the specific assemblies and systems illustrated in the attached drawings and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

Where they are used herein, the terms “first”, “second”, and so on, do not necessarily denote any ordinal, sequential, or priority relation, but are simply used to more clearly distinguish one element or set of elements from another, unless specified otherwise.

Where used herein, the term “exemplary” refers to “an example of” and is not intended to suggest any preferred or ideal embodiment.

The present disclosure provides for, inter alia, a dimensional measuring video system operable with a large field of view (“FOV”) and a high effective magnification and high focus repeatability. In an embodiment, the dimensional measuring video system includes an optical imaging system having a fixed lens utilized with multiple f-numbers in combination with different areas of a camera (i.e., digital sensor array) to produce the desired magnification. In an embodiment, the dimensional measuring video system includes an optical imaging system having movable lenses operable to produce a high quality image over a range of focal lengths with a large zoom ratio.

Figure 2:
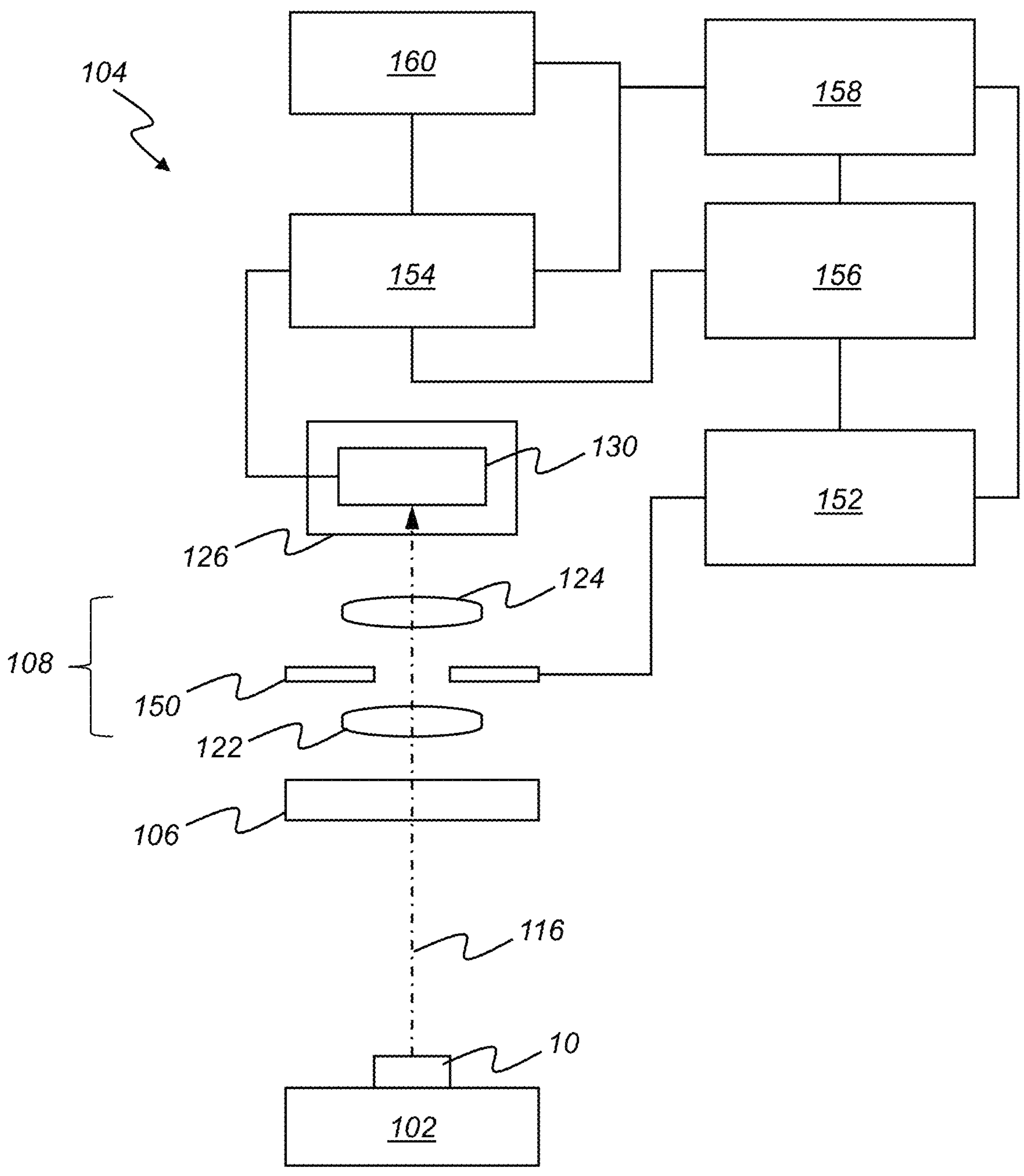
FIG. 2 is a schematic diagram of an optical imaging system according to an exemplary embodiment the presently disclosed subject matter.

As illustrated in FIGS. 1 and 2, in an embodiment, a dimensional measuring machine 100 is operable to measure a test object 10 mounted on a worktable (i.e., stage) 102. The dimensional measuring machine 100 includes an optical imaging system 104 having an illumination system 106. In an embodiment, the illumination system 106 comprises a ring light having a central aperture through which images of a worktable 102 and test object 10 are acquired. The annulus surrounding the central aperture of the illumination system 106 includes a plurality of light sources. For example, the illumination system 106 may include selectively activatable, essentially monochromatic, light sources such as, but not limited to, a plurality of light-emitting diodes (LEDs) operable to illuminate the test object 10. Persons skilled in the relevant art will recognize that the dimensional measuring machine 100 may utilize various illumination systems.

Referring now to FIG. 2, the optical imaging system 104 includes an objective lens 122 (i.e., front lens) located to collect at least a portion of the light illuminating the test object 10. The objective lens 122 collects light reflected by specular, diffuse, or some combination of specular and diffuse reflection from the surface of the test object 10.

The light collected by the objective lens 122 may be referred to as the image light beam 116. Portions of the image light beam 116 propagate through a focusing optic 124 (i.e., back lens) en route to a camera system 126. In certain embodiments, the focusing optic 124 comprises a fixed lens operable to form an image of the test object 10 on the digital sensor array 130. A lens system 108 of the optical imaging system 104 comprises the objective lens 122 and the focusing optic 124. The camera system 126 includes a digital sensor array 130 comprising, for example, area charge-coupled device (CCD) or complementary metal-oxide-semiconductor (CMOS) image sensors. As discussed in more detail below, the digital sensor array 130 includes a plurality of addressable pixels 200.

With continued reference to FIG. 2, in an embodiment, a variable size aperture 150 is positioned at the telecentric location of the focusing optic lens 124. The variable size aperture 150 is operable to change the f-number of the lens system 108 and therefore the optical imaging system 104. Because the variable size aperture 150 is positioned at the telecentric location of the optical imaging system 104, every FOV is telecentric. Each size of the variable size aperture 150 utilizes a different area of the digital sensor array 130 for imaging. The focusing optic lens 124 is parfocal to within the depth of field (“DOF”) d for each size of the variable size aperture 150. In an embodiment, because the optical imaging system 104 does not include optical elements moving in the z-axis, there is no need to recalibrate the magnification of the optical imaging system 104 when the effective magnification of the dimensional measuring machine 100 is changed.

Referring now to FIG. 1, in an embodiment, the optical imaging system 104 is mounted on a carriage 170 moveable along a vertical z-axis. The carriage 170 may be mounted on rails 172, 174 to facilitate translation along the z-axis and adjust the distance between the camera system 126 and the test object 10. The worktable 102 is mounted on another carriage 176 translatable along the y-axis via rails 178, 180 and translatable along the x-axis via rails 182, 184.

In an embodiment, the optical imaging system 104 includes a 2592×1944-pixel digital sensor array 130 having 2 μm square addressable pixels 200. The active sensor size of the digital sensor array 130 may be 5.4 mm×4.2 mm. In an embodiment, the dimensional measuring machine 100 includes a visual display 160 with 640×480 pixels (i.e., VGA resolution). The visual display 160 may be an image display screen.

In an embodiment, the dimensional measuring machine 100 includes a measurement controller 158 with edge detection software having optimum performance when the measured edge has five image pixels 202, 204, 206, 208, 210 within the diffraction limited spot size $S_d$ of the optical imaging system 104. The edge detection software processes contrast variations spread over a number of pixels and has an optimum number of image pixels in transition to achieve accurate, repeatable results. Therefore, the variable size aperture 150 is adjusted at each magnification to maintain approximately five image pixels 202, 204, 206, 208, 210 within the diffraction limited spot size $S_d$ of the optical imaging system 104 to optimize the edge detection algorithm. The design parameters for four effective magnifications are shown in the table of FIG. 3. The first column shows the number of pixels 200 in one dimension (e.g., x-axis) of the digital sensor array 130 that are binned for each magnification. The Binnings are the 1×1-groups, 2×2-groups, 3×3-groups, and 4×4-groups (e.g., square groups) of pixels of the digital sensor array 130, respectively. The Image Pixel Size is the size of one side of the square binned pixels and is equal to the digital sensor array 130 pixel size (e.g., 2 μm) multiplied by the number of pixels in each binned group. The Spot Size (i.e., diffraction limited spot size Sa) required for the edge detection algorithm to be optimized is equal to the Image Pixel Size multiplied by the number of pixels of the digital sensor array 130 required for the optimized edge detection algorithm (e.g., five image pixels).

Figure 4:
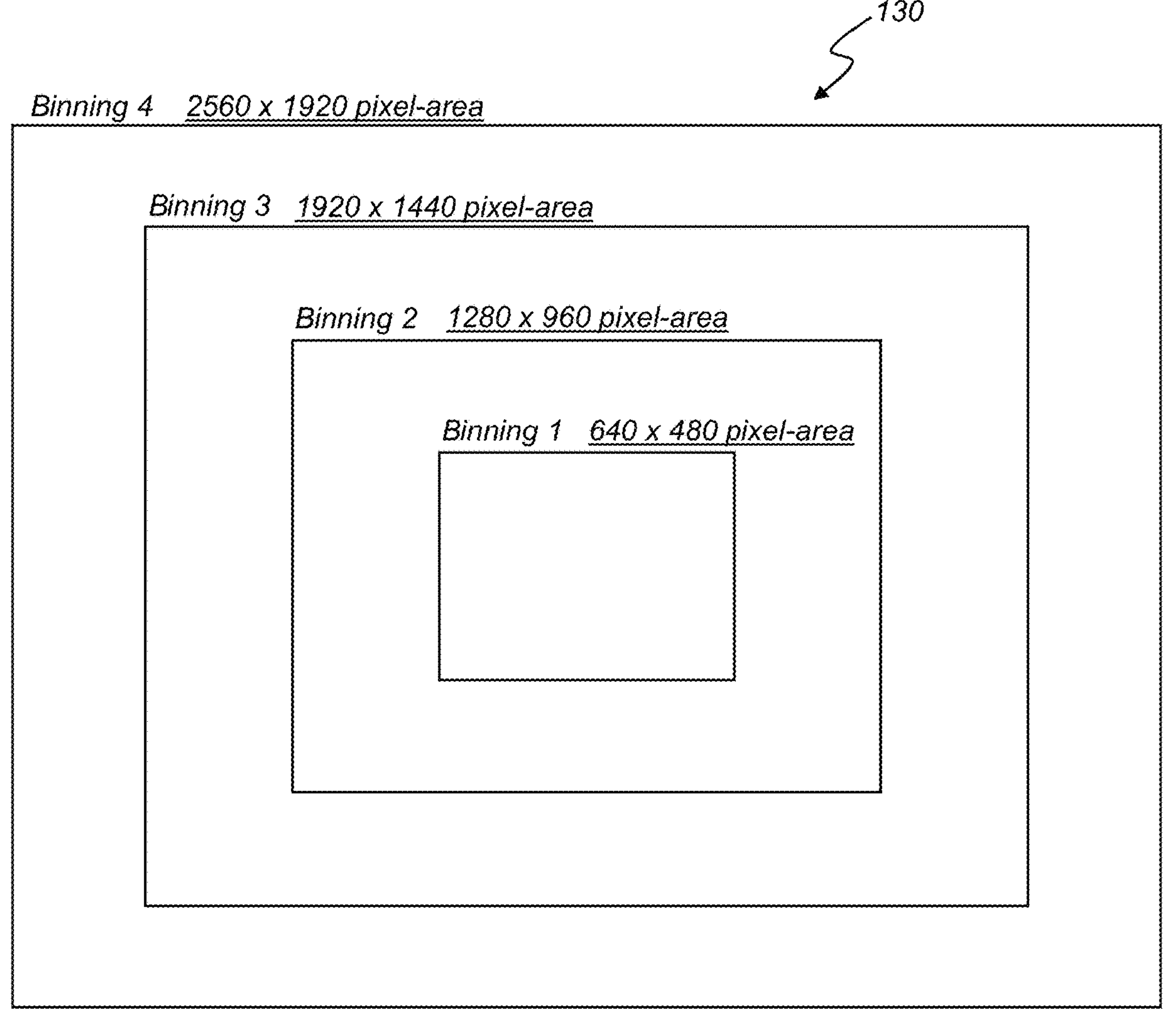
FIG. 4 is a schematic showing different areas of a digital sensor array utilized by an optical imaging system at different effective magnifications according to an exemplary embodiment the presently disclosed subject matter.

Referring now to FIG. 4, in an embodiment, the highest effective magnification of the optical imaging system 104 may be achieved utilizing the centrally positioned 640×480 pixels 200 of the digital sensor array 130. Lower effective magnifications of the optical imaging system 104 may be achieved by binning 2×2-groups, 3×3-groups, and 4×4-groups of pixels 200 of the digital sensor array 130 together to produce image pixels 202, 204, 206, 210 of increasing size while maintaining the 640×480 pixels in the image displayed via the image display screen 160. Because the size of the displayed image remains the same, as the size of the image pixels 202, 204, 206, 208, 210 is increased, the effective magnification of the displayed image decreases to half (½), one third (⅓), and a quarter (¼) of the highest effective magnification as the number of pixels 200 of the digital sensor array 130 being binned in each image pixel 202, 204, 206, 208, 210 size increase.

Figure 5A:
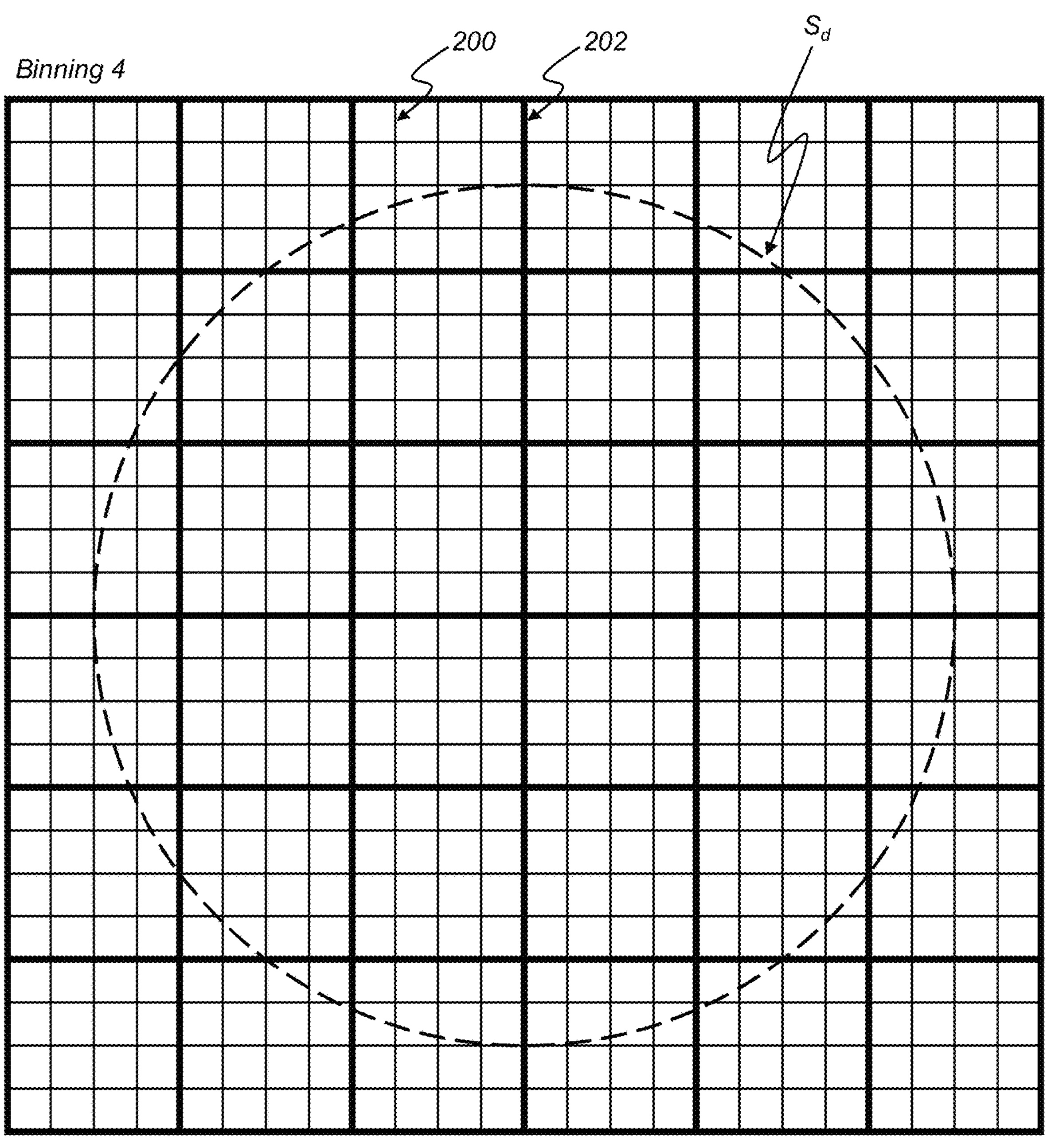
FIGS. 5A-5D show a schematic of the central 24×24 pixels of the digital sensor array according to FIG. 4 at different binnings.
Figure 5B:
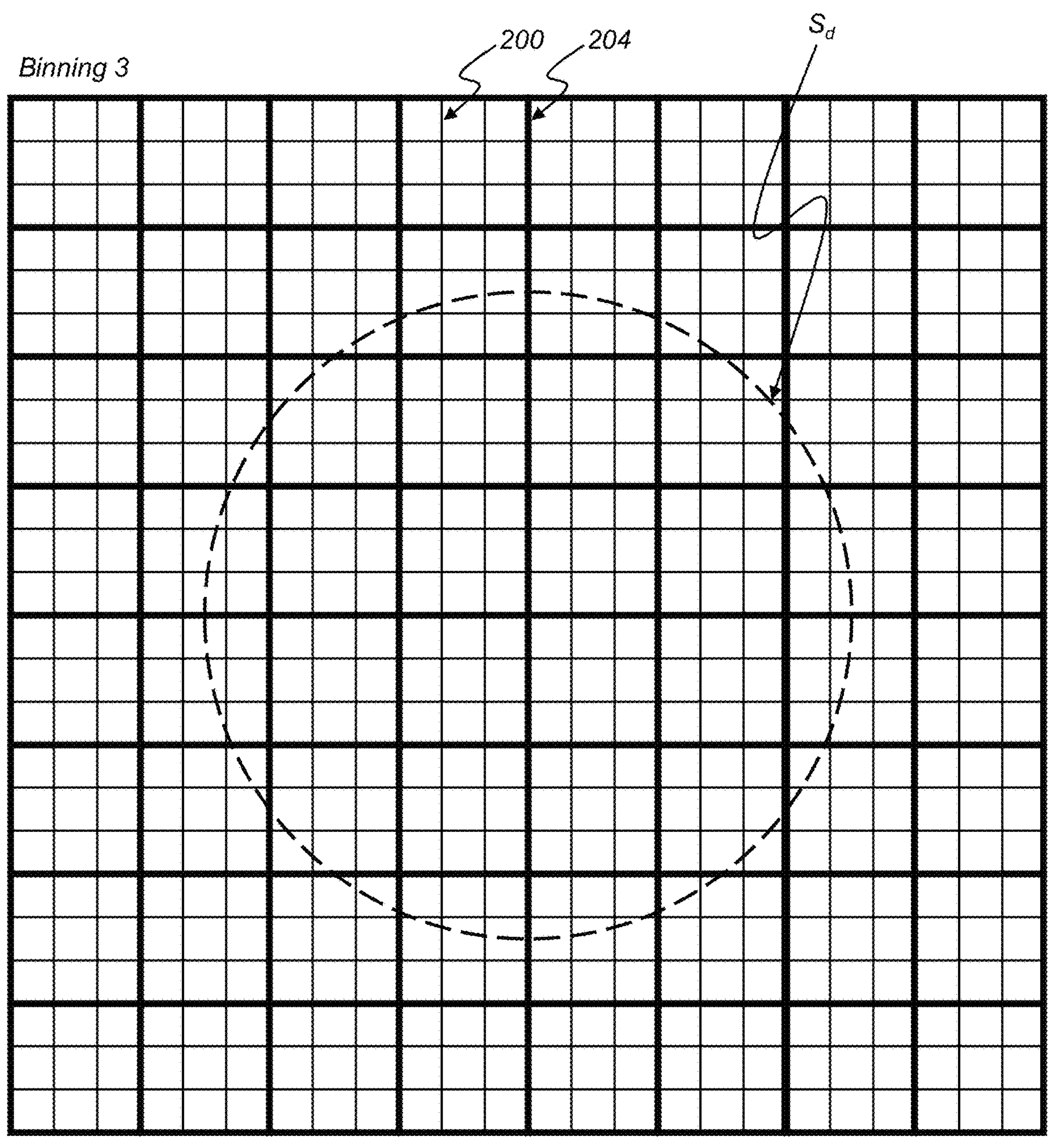
Figure 5C:
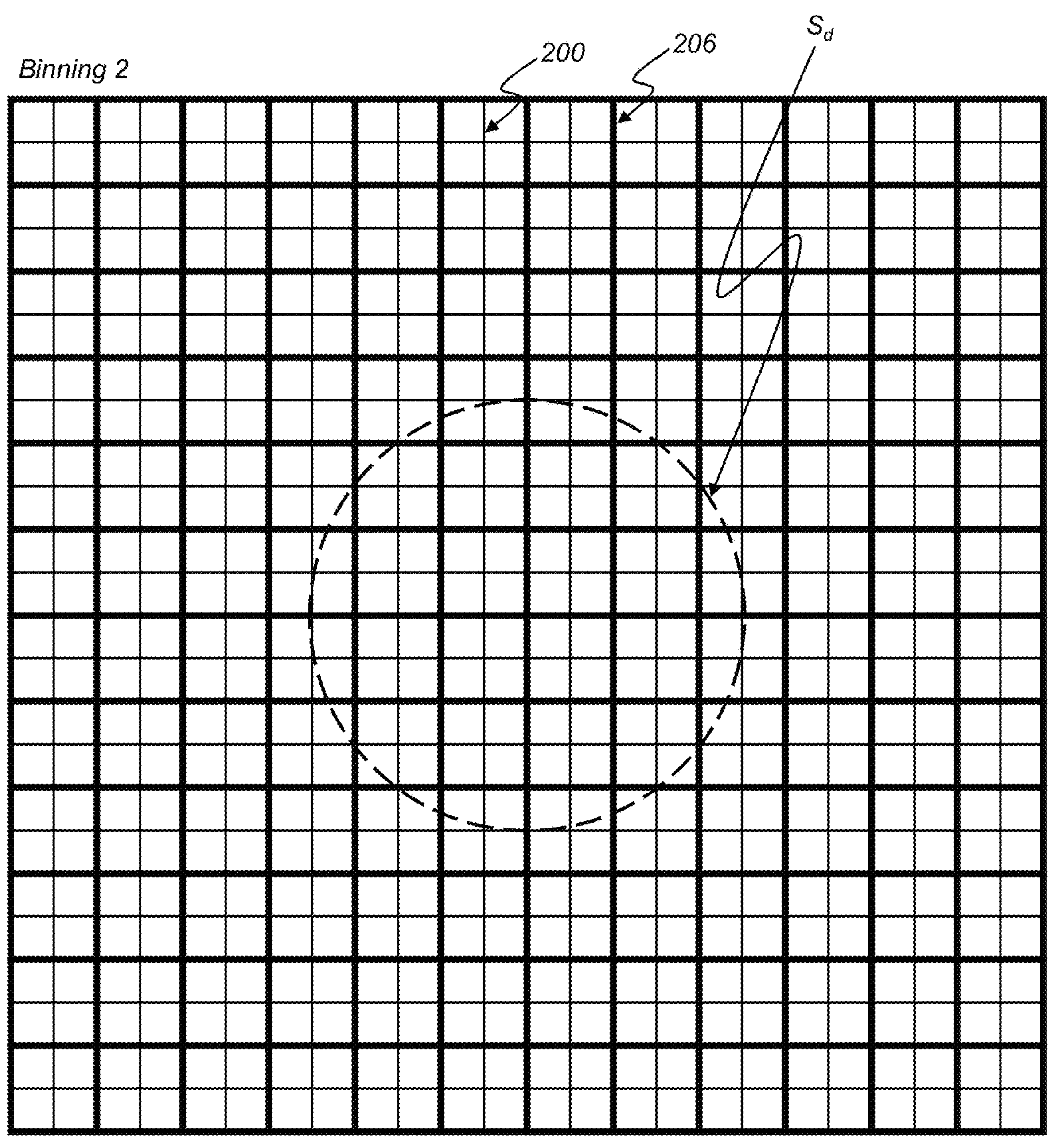
Figure 5D:
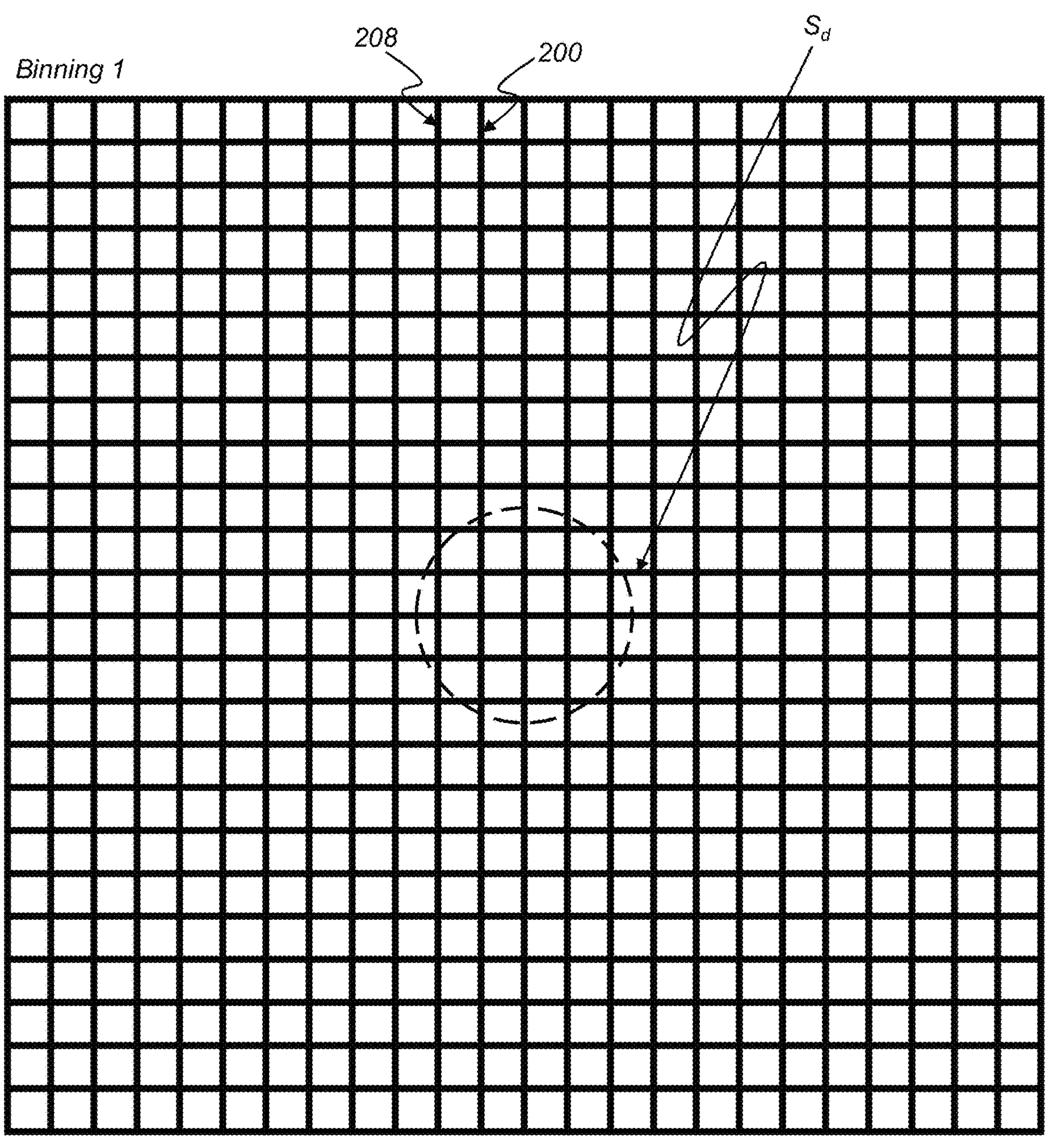

FIGS. 5A-5D show a schematic of the central 24×24 pixels 200 of the digital sensor array 130 at different binnings. The binning pattern is repeated across the digital sensor array 130 until the number of image pixels 202, 204, 206, 208, 210 required by the binning is reached. As illustrated in FIG. 5A, in Binning 4, 4×4 square areas of pixels 200 are binned to produce one output image pixel 202. As illustrated in FIG. 5B, in Binning 3, 3×3 square areas of pixels 200 are binned to produce one output image pixel 204. As illustrated in FIG. 5C, in Binning 2, 2×2 square areas of pixels 200 are binned to produce one output image pixel 206. As illustrated in FIG. 5D, in Binning 1, the 1×1 square areas of pixels 200 produce one output image pixel 208.

Figure 6:
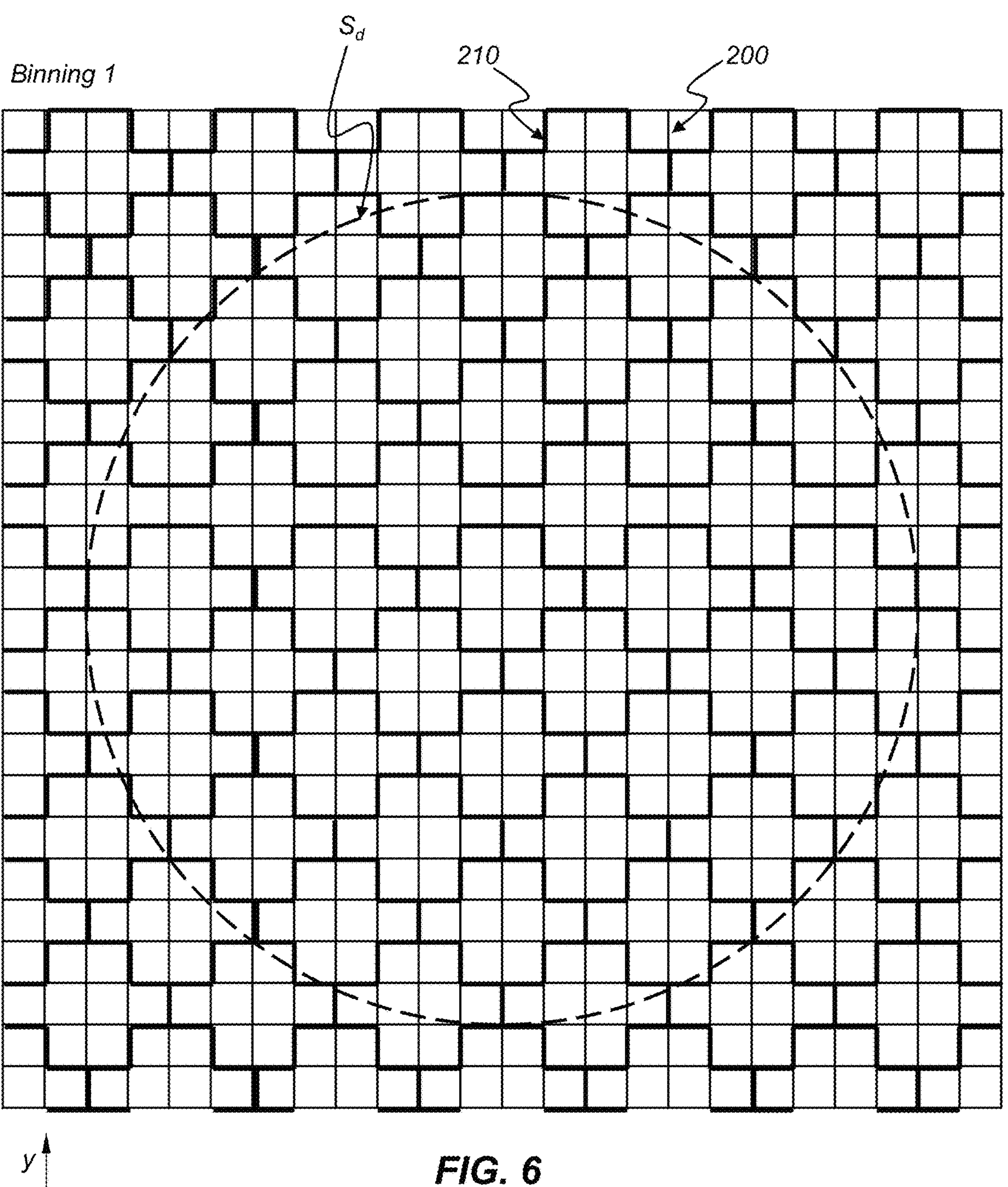
FIG. 6 shows a schematic of the central 24×24 pixels of the digital sensor array according to FIG. 4 at a non-square binning.

As shown in FIGS. 5A-5D, the pixels 200 may be binned in square groups to facilitate implementation in electronics. However, the groupings of pixels 200 need not be square. Any binning pattern that covers the required pixel area may be utilized. For example, as illustrated in FIG. 6, the rows of binned pixels 200 may be offset and staggered. In this example, Alternate Binning Pattern 1 has eight sensor pixels 200 in an image pixel 210. Binnings 2, 3, and 4 would have thirty-two, seventy-two, and one-hundred-twenty-eight sensor pixels 200 per image pixel 210 respectively.

The diffraction limited spot size $S_d$ on the digital sensor array 130, as expressed by the diameter of the Airy disc, is:

$$S_d = 2.44\lambda F_i = 2.44\lambda m F_o \tag{1}$$

where λ is the wavelength of light generated by the light source 106. In an embodiment, as illustrated in FIG. 3, the wavelength λ is 0.6 μm. $F_i$ is the f-number of the imaging system 104 on the digital sensor array 130 side of the fixed lens 124, and $F_o$ is the f-number on the test object 10 side of the fixed lens 124. The variable m is the magnification of the imaging system 104. Equation (1) may be solved for the f-numbers $F_i$, $F_o$.

The DOF d is limited to the range for which the defocus spot size $S_f$ in the object plane is less than that of the diffraction limited spot size $S_d$ in the object plane. At a distance x from focus, the defocus spot size $S_f$ is:

$$S_f = x/F_o \tag{2}$$

The defocus spot size $S_f$ has a diameter of $mS_f$ in the image plane. If the DOF d extends equally on both sides of focus, the DOF d divided by two (d/2) is the point at which the defocus spot size $S_f$ equals the diffraction limited spot size $S_d$ ($mS_f=S_d$). From Equation (1) and Equation (2):

$$m(d/2)/F_o = 2.44\lambda m F_o \tag{3}$$

From Equation (3), the DOF d can be calculated as a function of the f-number $F_o$ on the test object 10 side of the fixed lens 124:

$$d = 4.88\lambda F_o^2 \tag{4}$$

The resolution of the optical imaging system 104 is not limited by the size of the pixels 200 of the digital sensor array 130. The dimensional measuring machine 100 does not require the image processing software to be changed to accommodate the effective magnification. Consequently, the number of image pixels 202, 204, 206, 208, 210 in the image transmitted to the edge detection algorithm and the visual display 160 remain the same at each magnification.

An aperture controller 152 is in signal communication with the variable size aperture 150. As illustrated in FIG. 2, in an embodiment, the aperture controller 152 is electrically connected with the variable size aperture 150. In other embodiments, the aperture controller 152 is wirelessly connected with the variable size aperture 150 via Wifi, Bluetooth, or the like. The aperture controller 152 transmits signals to the variable size aperture 150 to vary the diameter of the variable size aperture 150 and image points of the test object 10 on the digital sensor array 130 at different diffraction limited spot size $S_d$ diameters. The diameter of the variable size aperture 150 is adjusted to vary the diameter of the diffraction limited spot $S_d$ to maintain the aperture diameter relative to the image pixel 202, 204, 206, 208, 210 size. As shown in FIG. 3, the diameter of the diffraction limited spot $S_d$ is determined by the number of image pixels 202, 204, 206, 208, 210 required for the optimized edge detection algorithm (e.g., five image pixels) being used with the dimensional measuring machine 100. The number of image pixels 202, 204, 206, 208, 210 within the diffraction limited spot $S_d$ does not have to be exactly the same at each magnification.

In the optical imaging system 104, the low-magnification state provides a large FOV with a large f-number and a large DOF d. The high-magnification state provides a smaller FOV with a smaller f-number and a smaller DOF d. Each size of the aperture 150 uses a different area (i.e., number of pixels 200) of the digital sensor array 130, and each size of the aperture 150 provides a different camera resolution. In the low-magnification state (e.g., Binning 4) substantially the entire digital sensor array 130 is used. Utilizing substantially the entire digital sensor array 130 provides the largest FOV of the optical imaging system 104. In the low-magnification state the aperture 150 is the smallest diameter utilized, which provides the largest DOF d and f-number.

In the high-magnification state (e.g., Binning 1) only a generally 640×480-pixel portion of the digital sensor array 130 is used. In the high magnification state the aperture 150 is the greatest diameter utilized, which provides the smallest FOV and f-number. In an embodiment, in the high-magnification state pixels 200 outside of the central 640×480-pixel portion of the digital sensor array 130 are ignored by the measurement controller 158. At the high-magnification state, the optical imaging system 104 utilizes the full resolution of the digital sensor array 130 by using image data from each sensor pixel 200, while only utilizing image data at the center 640×480-pixel portion of the digital sensor array 130. The high-magnification state provides the best edge detection and focus repeatability.

The effective magnification of the dimensional measuring machine 100 is determined by the size of the area of the digital sensor array 130 used to create the image on the visual display 160. For example, if the same area of the image display screen 160 is utilized at different f-number settings, then the effective magnification associated with the different f-number settings is related to different size image pixels 202, 204, 206, 208, 210. The image pixels 202, 204, 206, 208, 210 describe sub-areas of the digital sensor array 130 from which pixel output data is drawn (i.e., contiguous clusters of addressable pixels having a common output) to fill the image display screen. If, via binning, the same number of pixel outputs of the digital sensor array 130 are passed to the image display screen 160 at the different f-number settings, then the image display screen 160 resolution would appear to remain constant. If the change in the size of the sub-areas of the digital sensor array 130 filling the image display screen 160 with a given number of pixel outputs (i.e., image pixels 202, 204, 206, 208, 210) remains proportional to the change in the f-number setting, then both the effective magnification and the resolution of the test object 10 on the display screen would remain proportional to the change in the f-number setting.

With reference now to FIG. 2, an image controller 154 is in signal communication with the digital sensor array 130. In an embodiment, the image controller 154 is electrically connected with the digital sensor array 130. The image controller 154 transmits signals to the digital sensor array 130 to bin the pixels 200 of the digital sensor array 130 to create image pixels 202, 204, 206, 208, 210. Binning comprises grouping contiguous clusters of the pixels 200 of the digital sensor array 130 to a common output (i.e., image pixel). The number of pixels 200 of the digital sensor array 130 within each cluster can be varied.

The number of image pixels 202, 204, 206, 208, 210 in the diffraction limited spot size $S_d$ remains substantially constant as the effective magnification is changed to keep the edge detection optimized. In another embodiment, the edge detection software could be modified if the diffraction limited spot size $S_d$ were changed for other reasons.

Substantially the same number of image pixels 202, 204, 206, 208, 210 are maintained within the diffraction limited spot sizes $S_d$ at the different effective magnifications (i.e., the different f-number settings of the optical imaging system 104), while the number of pixels 200 of the digital sensor array within the diffraction limited spots $S_d$ changes at the different effective magnifications. Equation (1) demonstrates that the diffraction limited spot size $S_d$ diameter is proportional to the f-number setting of the optical imaging system 104. If the same number of image pixels 202, 204, 206, 208, 210 fills the different diffraction limited spot sizes $S_d$ at the different f-number settings, the size of the image pixels 202, 204, 206, 208, 210 varies proportionally with the f-number settings. The relative size of the image pixels 202, 204, 206, 208, 210 at the different f-number settings may vary somewhat without substantially affecting the accuracy of the edge detector.

A magnification controller 156 is in signal communication with the aperture controller 152 and the image controller 154. In an embodiment, the magnification controller 156 is electrically connected with the aperture controller 152 and the image controller 154. The magnification controller 156 transmits signals to the aperture controller 152 and the image controller 154 to increase or decrease the number of pixels 200 within each image pixel 202, 204, 206, 208, 210 (i.e., binned cluster of contiguous pixels 200 of the digital sensor array 130) as a function of an increase or decrease, respectively, in the diffraction limited spot size $S_d$ diameter at which points of the test object 10 are imaged.

Each of the image pixels 202, 204, 206, 208, 210 occupies a sub-area of the digital sensor array 130 in accordance with the number of pixels 200 within each cluster of binned pixels 200. The magnification controller 156 varies the sub-areas (i.e., image pixels 202, 204, 206, 208, 210) in size in accordance with variations in the diffraction limited spot size $S_d$ diameters at which points of the test object 10 are imaged. Further, the magnification controller 156 is operable to vary the size of the sub-areas of the digital sensor array 130 to more closely maintain the size of the sub-areas as a given fractional portion of the diffraction limited spot size $S_d$ diameters at which points of the test object 10 are imaged. The magnification controller is operable to fill spot sizes $S_d$ associated with different aperture 150 sizes with substantially the same number of image pixels 202, 204, 206, 208, 210. However, the edge detection algorithm does not fail if the number of image pixels 202, 204, 206, 208, 210 within each spot size $S_d$ vary. For example, a half of one image pixel 202, 204, 206, 208, 210, or greater, variation in the number of image pixels 202, 204, 206, 208, 210 within each spot size $S_d$ does not impede performance of the edge detection algorithm for many test objects. Consistent performance of the edge detection software is maintained when about the same number of image pixels 202, 204, 206, 208, 210 are included in each spot size $S_d$ across the edge as effective magnification is changed. The effective magnification of the test object 10 on the image display screen 160 is inversely proportional to the total size of the sub-areas of the digital sensor 130.

In a low-magnification state, the optical imaging system 104 provides both a large field of view and a large depth of field for identifying the type and location of one or more features of the test object 10 presented for measurement. The optical imaging system 104 in a low-magnification state can provide video measurements of a range of feature sizes of the test object 10 with a given range of accuracy. In a high-magnification state, the optical imaging system 104 provides both a smaller field of view and a smaller depth of field for measuring smaller features of the test object 10, and/or measuring height variations in the surface of the test object 10 via an autofocus method in which surface height is correlated with best focus positions. Measurements may be made by translating the worktable 102 and test object 10 with respect to the optical imaging system 104 to identify focus positions and measure the translations. Autofocus measurements may be made via translating the one or more elements of the imaging optical imaging system 104 along the optical axis (e.g., z-axis) and measuring the element displacements.

Figure 7A:
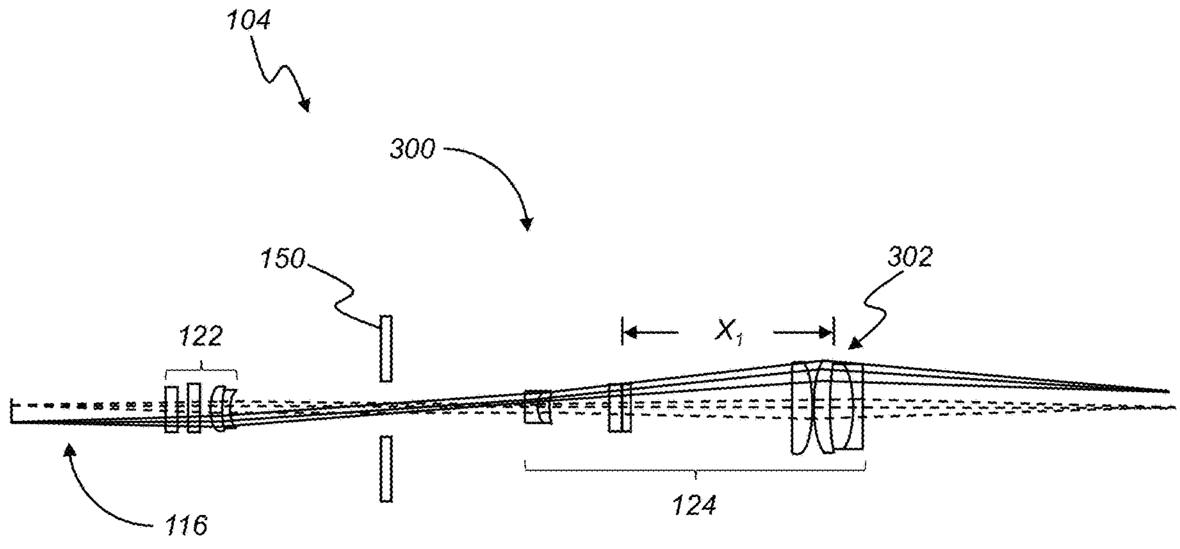
FIGS. 7A and 7B show a schematic of a lens system having a pair of doublets operable to move along the optical axis according to an exemplary embodiment in the presently disclosed subject matter.
Figure 7B:
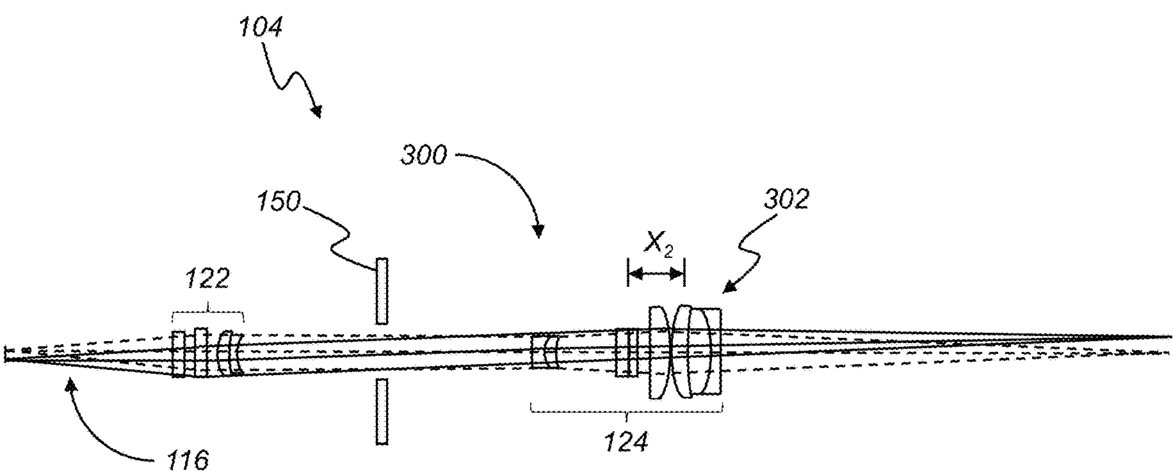

In embodiments of the presently disclosed subject matter, the zoom range of the dimensional measuring machine 100 can be extended beyond the zoom range available to a fixed-lens optical imaging system 104 in several ways. Referring now to FIGS. 7A and 7B, in an embodiment, a lens system 300 of the optical imaging system 104 comprises the objective lens 122 and the focusing optic 124. The zoom range of the optical imaging system 104 may be increased by enabling one or more elements of the lens system 300 to move along the optical axis. In an embodiment, a pair of doublets 302 of the focusing optic 124 move along the optical axis to change the magnification of the lens system 300. For example, the optical magnification of the optical imaging system 104 may be changed from 1× to 2× by moving the pair of doublets 302 from their $X_1$ position in FIG. 7A to their $X_2$ position in FIG. 7B. By moving the pair of doublets 302 along the optical axis between these two reproducible positions $X_1$, $X_2$, the zoom range of the optical imaging system 104 is doubled.

Figure 8A:
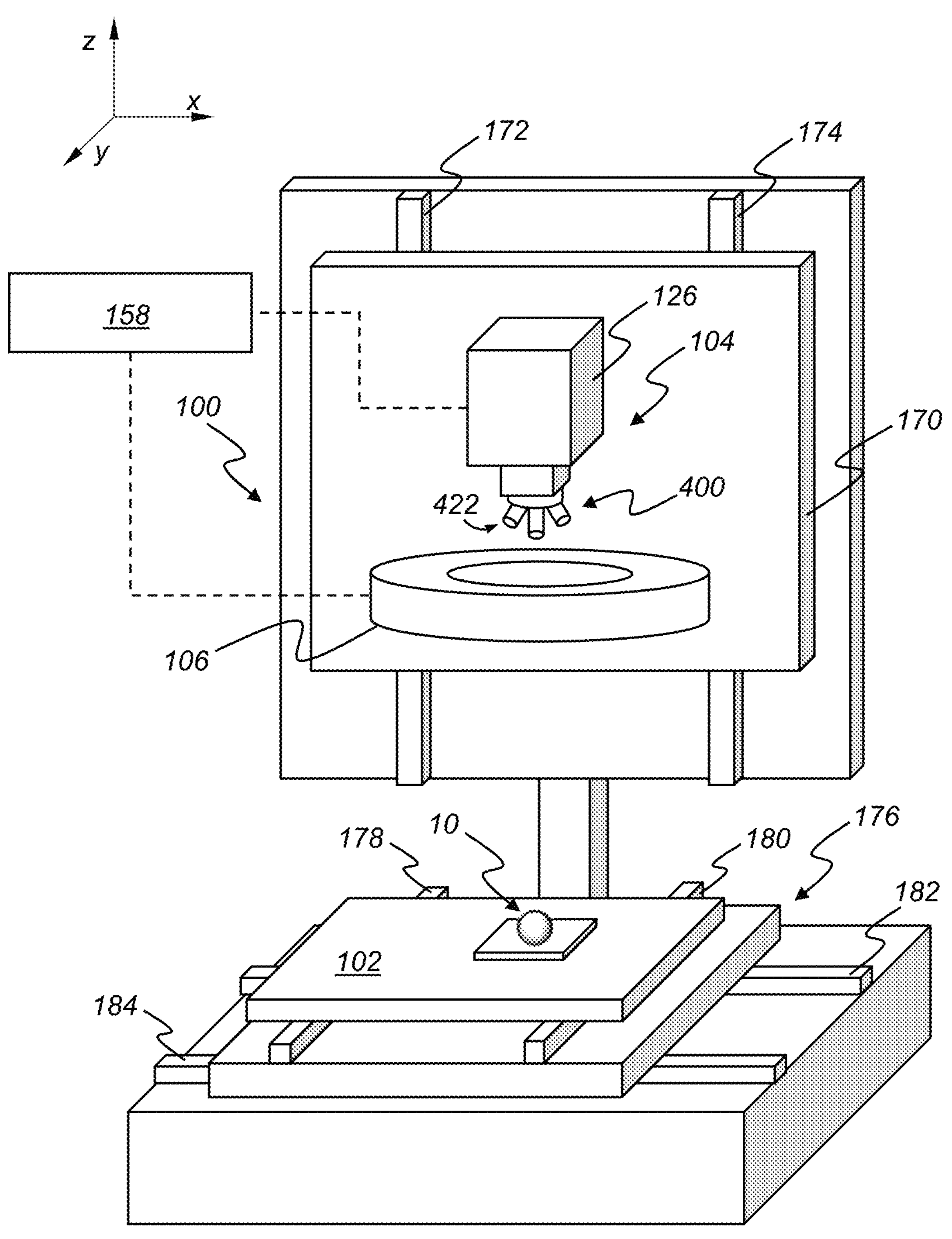
FIG. 8A is a schematic perspective view of a dimensional measuring machine having a lens turret according to an exemplary embodiment in the presently disclosed subject matter.
Figures 8B, 8C:
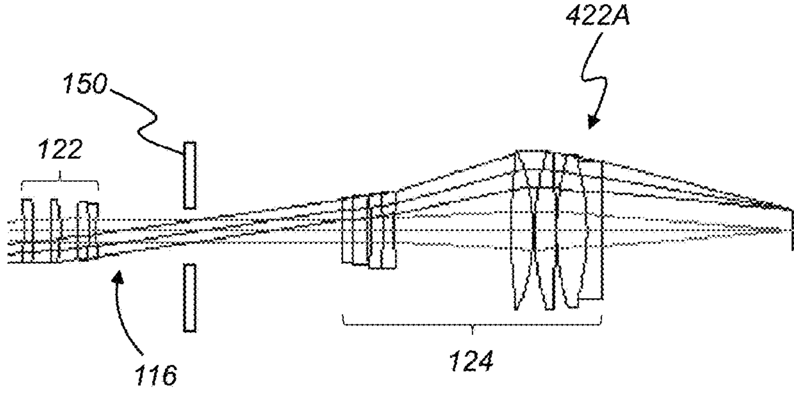
FIGS. 8B and 8C show a schematic of an optical imaging system with different objective lenses in position along the optical axis according to FIG. 8A.

In another embodiment, as illustrated in FIGS. 8A, 8B, and 8C, the optical imaging system 104 includes a lens turret 400. The lens turret 400 may include multiple objective lenses 422A, 422B having different optical magnifications such that magnification of the optical imaging system 104 is changed by moving or rotating the lens turret 400 to align the objective lens 422A, 422B providing the appropriate or desired magnification. In an embodiment, the lens turret 400 includes objective lens 422A providing 0.5× magnification and objective lens 422B providing 1.1× magnification. In another embodiment, additional objective lenses 422 are included with the lens turret 400. Similarly, multiple objective lenses mounted in a slider may be utilized in the same manner as the lens turret 400.

Figure 9A:
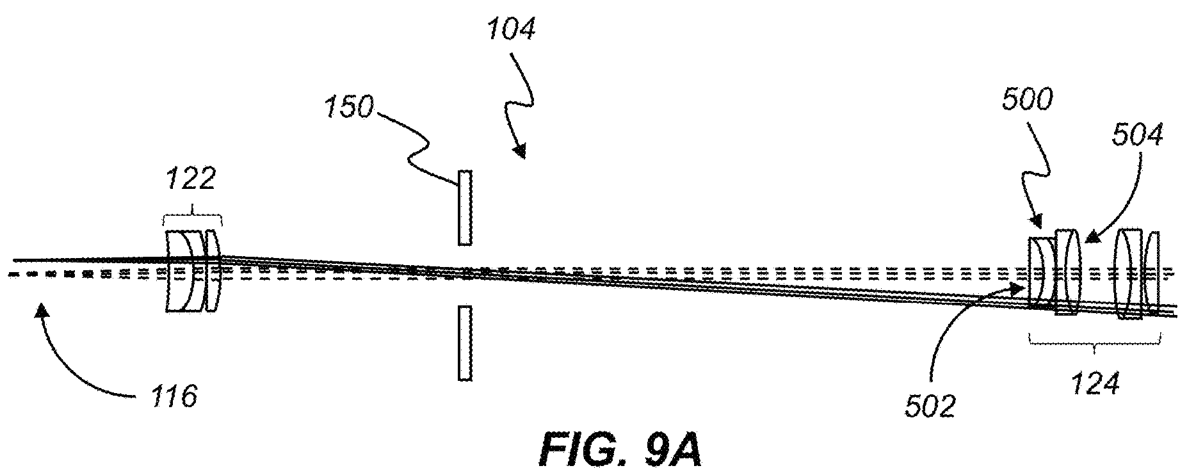
FIGS. 9A and 9B show a schematic of a portion of an optical imaging system having a compound lens operable to flip/reverse position to change magnification of the system according to an exemplary embodiment in the presently disclosed subject matter.
Figure 9B:
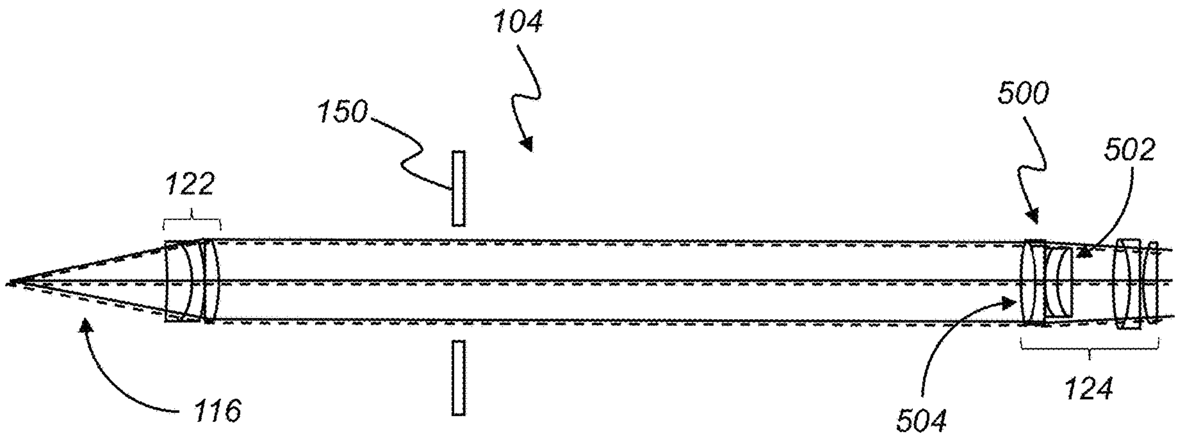

In an embodiment, as illustrated in FIGS. 9A and 9B, the optical imaging system 104 includes a focusing optic 124 having a compound lens 500. The zoom of the optical imaging system 104 is increased by flipping/reversing the compound lens 500 along the optical axis. For example, the magnification may be increased from 1.71× to 2× by flipping the compound lens 500 from the position shown in FIG. 9A to the position shown in FIG. 9B. In other words, the compound lens 500 as shown in FIG. 9A is inverted in FIG. 9B such that the image light beam 116 passes through the compound lens 500 in the reverse direction. As illustrated in FIG. 9A, image light beam 116 enters a second surface 504 of the compound lens 500 and exits through a first surface 502 of the compound lens 500. As illustrated in FIG. 9B, once the compound lens 500 is inverted, image light beam 116 enters the first surface 502 and exits through the second surface 504. In an embodiment, the compound lens 500 is a pair of lenses.

Figure 10:
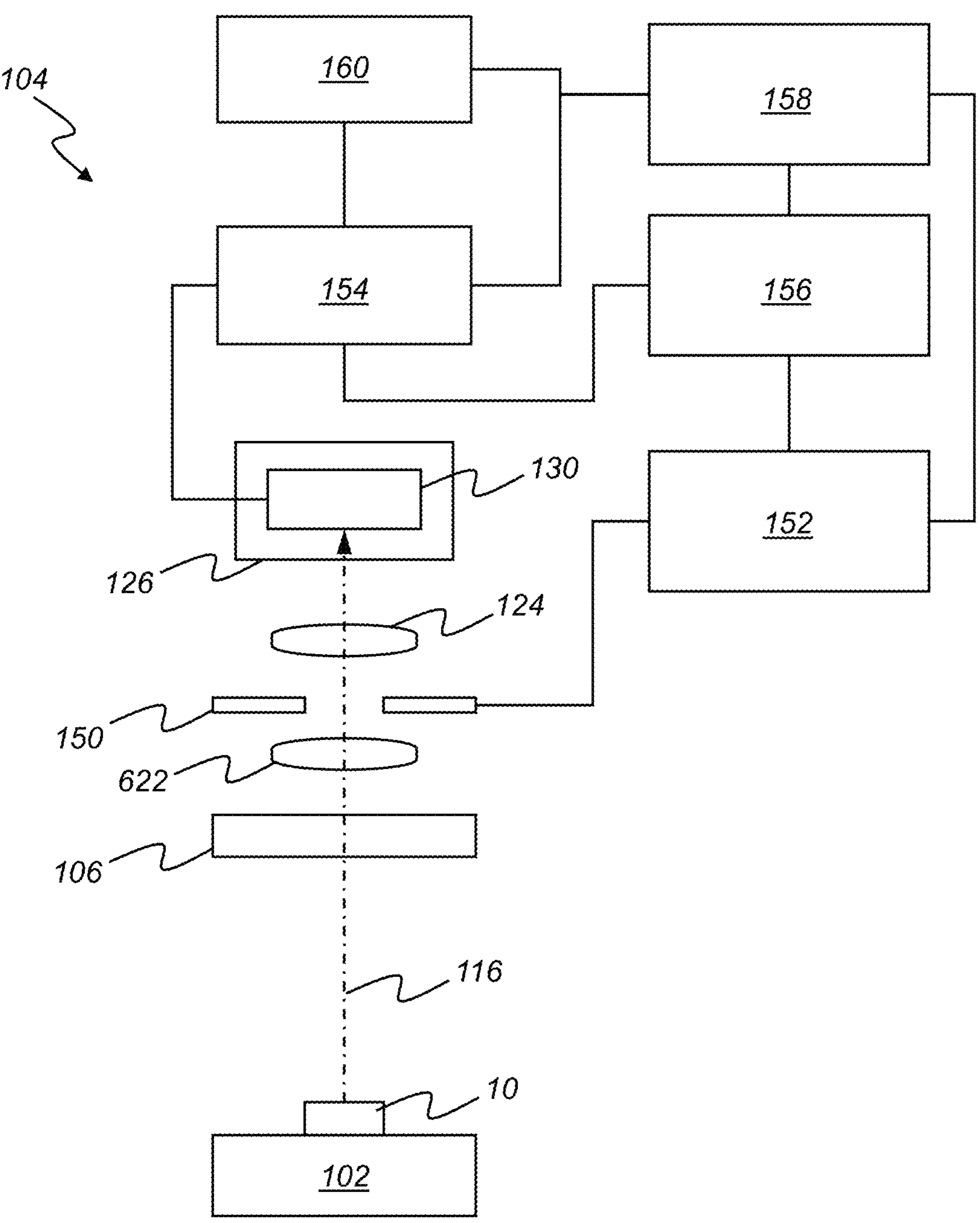
FIG. 10 is a schematic diagram of an optical imaging system according to an exemplary embodiment in the presently disclosed subject matter.

In yet another embodiment, as illustrated in FIG. 10, the objective lens 122 of the lens system 108 may be supplemented, or replaced, with an electro-optical lens 622. The focal length of the electro-optical lens 622 can be changed electrically by a factor of two or more without necessitating a change in position of the electro-optical lens 622 within the optical imaging system 104. For example, the electro-optical lens 622 may be one of the Optotune EL series electrically tunable lenses sold by Stemmer Imaging AG having a place of business at Gutenbergstraße 9-13, 82178 Puchheim, Germany—incorporated herein by reference in their entirety. The electro-optical lens 622 is operable to change shape utilizing a combination of optical fluids and a polymer membrane. In an embodiment, the electro-optical lens 622 includes a container filled with an optical liquid and sealed with an elastic polymer membrane. A circular ring operable to engage the elastic polymer membrane facilitates shaping of the electro-optical lens 622. The focal length of the electro-optical lens 622 is changed via pressing fluid into the center of the lens utilizing a current controlled voice coil.

Figure 11A:
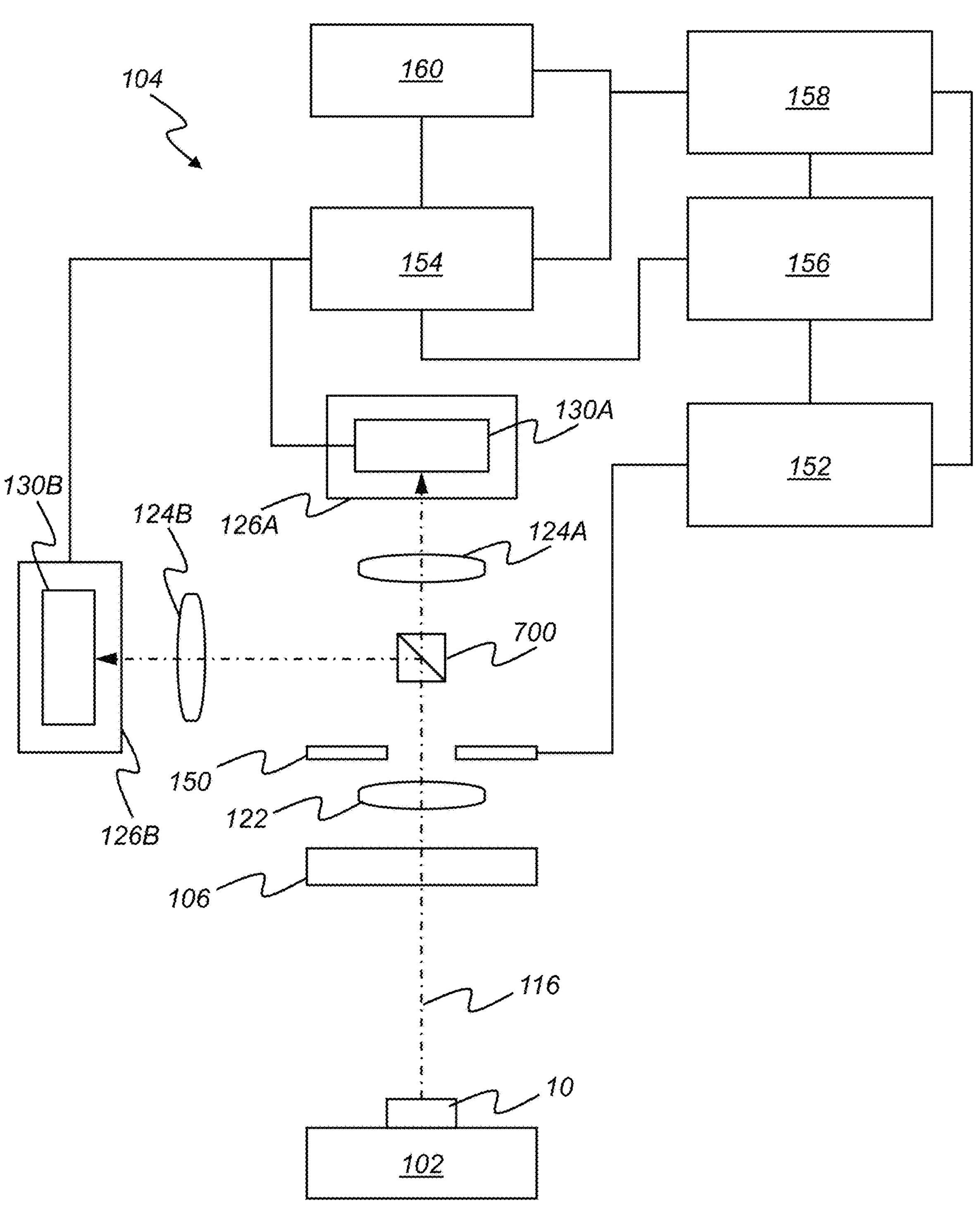
FIG. 11A is a schematic diagram of an optical imaging system according to an exemplary embodiment in the presently disclosed subject matter.
Figure 11B:
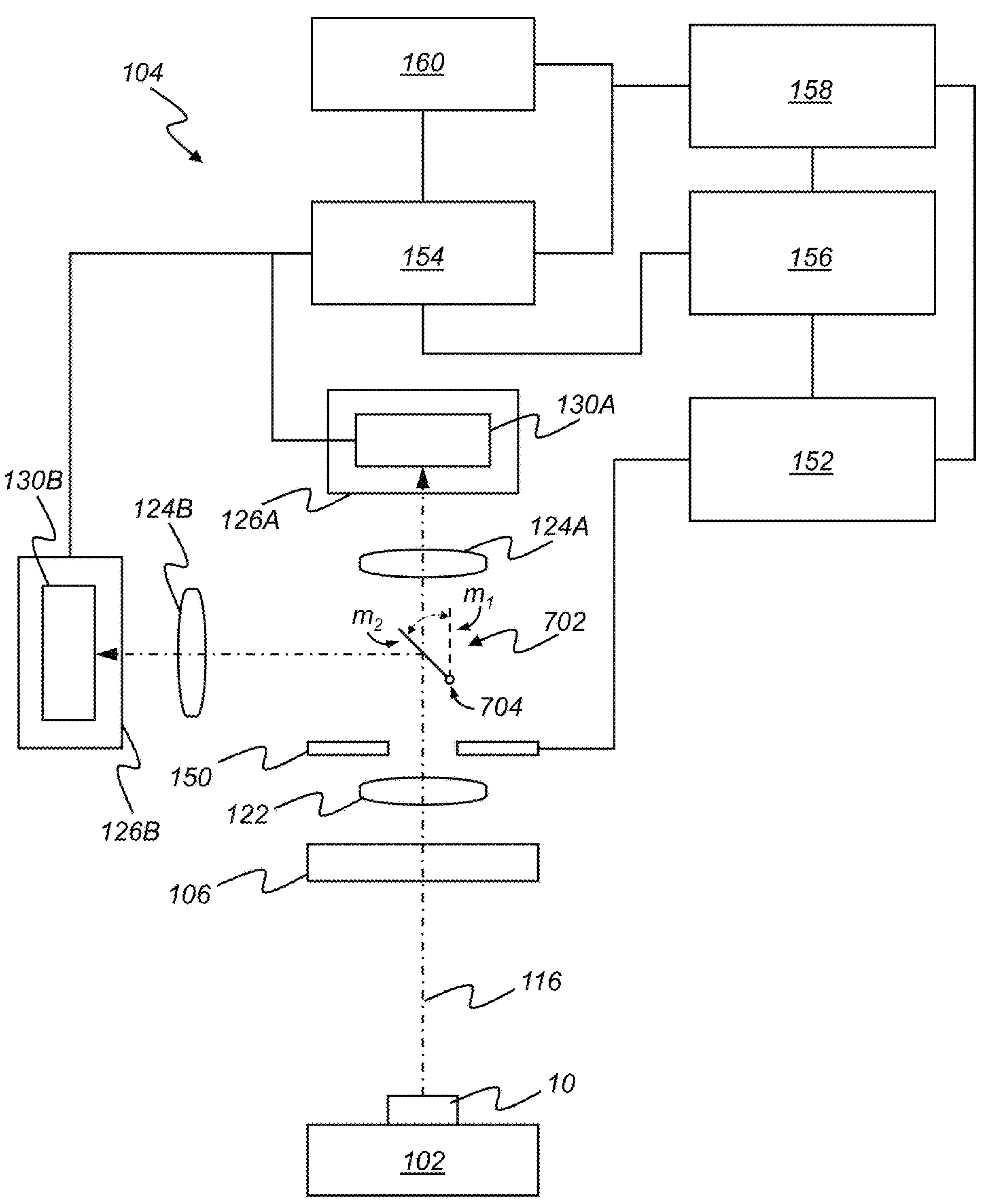
FIG. 11B is a schematic diagram of an optical imaging system according to an exemplary embodiment in the presently disclosed subject matter.
Figure 11C:
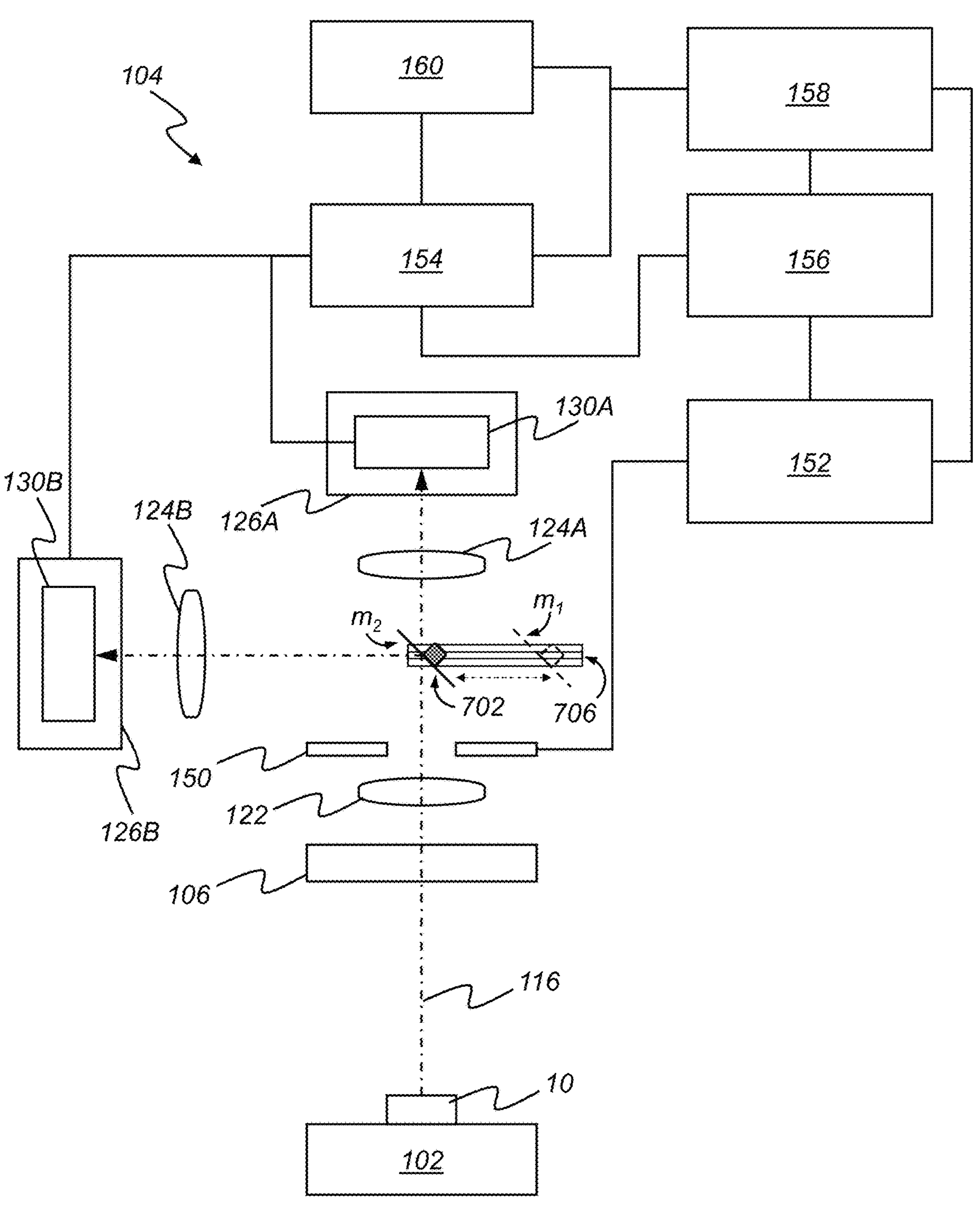
FIG. 11C is a schematic diagram of an optical imaging system according to an exemplary embodiment in the presently disclosed subject matter.

In another embodiment, as illustrated in FIGS. 11A-11C, the zoom range of the dimensional measuring machine 100 can be extended beyond the zoom range available to a fixed-lens optical imaging system 104 by utilizing two virtual zoom lenses having different optical magnifications. In other words, the dimensional measuring machine 100 utilizes two camera systems 126A, 126B each having a digital sensor array 130A, 130B comprising, for example, area charge-coupled device (CCD) or complementary metal-oxide-semiconductor (CMOS) image sensors as described supra. In an embodiment, the two camera systems 126A, 126B share the objective lens 122, but have separate focusing optics 124A, 124B (i.e., back lenses) providing different magnifications to each camera system 126A, 126B. The image controller 154 is in signal communication with the second digital sensor array 130B. In an embodiment, the image controller 154 is operable to determine which digital sensor array 130A, 130B is used to make measurements and create the image on the visual display 160 as a function of predetermined magnification parameters. In another embodiment, an operator is operable to manually switch the digital sensor array 130A, 130B used to make measurements and create the image on the visual display 160. In an embodiment, as illustrated in FIG. 11A, portions of the image light beam 116 collected by the objective lens 122 are directed to the second focusing optic 124B of second camera system 126B via a beam splitter 700.

In another embodiment, as illustrated in FIGS. 11B and 11C, the image light beam 116 collected by the objective lens 122 is selectively directed to the second focusing optic 124B of the second camera system 126B via a specularly reflective surface 702. Referring to FIG. 11B, the reflective surface 702 may, for example, include a mirror connected with a pivot 704 operable to rotate the mirror 702 from a first position $m_1$ outside of the optical path of the image light beam 116 to a second position $m_2$ within the optical path of the image light beam 116. Referring now to FIG. 11C, the reflective surface 702 may, for example, include a mirror connected with a slide 706 operable to translate the mirror 702 from a first position $m_1$ outside of the optical path of the image light beam 116 to a second position $m_2$ within the optical path of the image light beam 116.

One or more features of the embodiments described herein may be combined to create additional embodiments which are not depicted. While various embodiments have been described in detail above, it should be understood that they have been presented by way of example, and not limitation. It will be apparent to persons skilled in the relevant arts that the disclosed subject matter may be embodied in other specific forms, variations, and modifications without departing from the scope, spirit, or essential characteristics thereof. The embodiments described above are therefore to be considered in all respects as illustrative, and not restrictive. The scope of the invention is indicated by the appended claims, and all changes that come within the meaning and range of equivalents thereof are intended to be embraced therein.

What is claimed is:

1. A method of edge detection with an optical measuring machine, comprising:

aligning a test object with a lens system operable to form an image of the test object on a digital sensor having an array of addressable pixels, and wherein the lens system is operable to image points of the test object on the digital sensor at different spot sizes;

setting the lens system to a first spot size;

binning contiguous clusters of the addressable pixels to image pixels having a first size in accordance with the number of addressable pixels within each of the image pixels;

identifying contrast variations of the test object imaged onto the digital sensor over a number of image pixels at the first spot size, whereby an area of the test object is imaged at a first effective magnification.

2. The method of edge detection according to claim 1, further comprising setting the lens system to a second spot size, binning contiguous clusters of the addressable pixels to image pixels having a second size in accordance with the number of addressable pixels within each of the image pixels, and identifying contrast variations of the test object imaged onto the digital sensor over substantially the same number of image pixels at the lens system second spot size as at the lens system first spot size, whereby an area of the test object is imaged at a second effective magnification.

3. The method of edge detection according to claim 2, wherein the lens system is adjusted at each magnification to maintain substantially the same number of image pixels within each spot size.

4. The method of edge detection according to claim 2, wherein the steps of identifying the contrast variations of the test object include imaging the test object on a visual display, and the different size image pixels image the test object at different magnifications.

5. The method of edge detection according to claim 2, wherein the step of setting the lens system to the second spot size decreases an f-number of the lens system and decreases a spot size at which the test object is imaged on the digital sensor, and the step of binning contiguous clusters of the addressable pixels to image pixels having a second size reduces the image pixels in size in accordance with a smaller spot size at which points of the test object are imaged.

6. The method of edge detection according to claim 5, wherein the step of binning contiguous clusters of the addressable pixels of the digital sensor reduces the size of the image pixels to substantially maintain the size of the image pixels as a given fractional portion of a spot size at which points of the test object are imaged.

* * * * *